United States Patent
Hung et al.

(10) Patent No.: US 11,740,858 B2
(45) Date of Patent: Aug. 29, 2023

(54) ULTRASOUND-BASED AUDIO PLAYBACK METHOD AND ULTRASOUND-BASED ELECTRONIC DEVICE

(71) Applicant: REALTEK SEMICONDUCTOR CORPORATION, Hsinchu (TW)

(72) Inventors: Tien-Chiu Hung, Hsinchu (TW); Chung-Shih Chu, Hsinchu (TW); Wei-Chung Ting, Hsinchu (TW); Tse-En Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/547,530

(22) Filed: Dec. 10, 2021

(65) Prior Publication Data
US 2022/0283772 A1    Sep. 8, 2022

(30) Foreign Application Priority Data
Mar. 2, 2021    (TW) .................. 110107390

(51) Int. Cl.
*H04R 29/00*    (2006.01)
*G06F 3/16*    (2006.01)
(Continued)

(52) U.S. Cl.
CPC .............. *G06F 3/165* (2013.01); *H04R 1/08* (2013.01); *H04R 3/00* (2013.01); *H04R 2430/01* (2013.01)

(58) Field of Classification Search
CPC .. G06F 3/165; H04R 1/08; H04R 3/00; H04R 2430/01
(Continued)

(56) References Cited

U.S. PATENT DOCUMENTS 8,811,119 B2    8/2014  Aarts et al.
9,225,937 B2    12/2015 Sun et al.
(Continued)

FOREIGN PATENT DOCUMENTS

CN    102893175 A    1/2013

OTHER PUBLICATIONS

OA letter of the counterpart TW application (appl. No. 11010/390) dated Oct. 28, 2021. Summary of the OA letter: (1) Claims 1-3, 8-10 and 4-7 are rejected under Patent Law Article 33 as containing two or more inventions. (2) Claims 1 and 8 are rejected under Patent Law Article 26(2) as being indefinite. (3) Claims 1-2 and 8-9 are rejected under Patent Law Article 22(2) as being unpatentable over reference 1 Summary of the 0A letter_updated.txt (1) claims 1-3, 8-10 and 4-7 are rejected under Patent Law Article 33 as containing two or more inventions. (2) Claims 1 and 8 are rejected under Patent Law Article 26 (2) as being indefinite. (3) Claims 1-2 and 8-9 are rejected under Patent Law Article 22 (2) as being unpatentable over reference 1 (CN102893175A) .) Claims 1-10 in TW counterpart application correspond to claims 1-10 in US application , respectively.

*Primary Examiner* — Ammar T Hamid
(74) *Attorney, Agent, or Firm* — WPAT, P.C (57) ABSTRACT

An audio playback method includes the following steps: receiving an ultrasound signal via a microphone; processing the ultrasound signal to obtain a characteristic value of the ultrasound signal; obtaining time lag information based on the characteristic value; and controlling audio delay according to the time lag information.

10 Claims, 7 Drawing Sheets

(51) Int. Cl.
*H04R 3/00* (2006.01)
*H04R 1/08* (2006.01)

(58) Field of Classification Search
USPC .................................................. 381/56, 58
See application file for complete search history.

(56) References Cited

U.S. PATENT DOCUMENTS

| 9,769,552 B2 | 9/2017 | Choisel et al. |
| 2014/0160880 A1* | 6/2014 | King ............... H04B 11/00 367/2 |
| 2020/0145539 A1 | 5/2020 | Liu |

* cited by examiner

ULTRASOUND-BASED AUDIO PLAYBACK METHOD AND ULTRASOUND-BASED ELECTRONIC DEVICE

BACKGROUND OF THE INVENTION

1. Field of the Invention

The present invention generally relates to audio signals, and, more particularly, to the playback delay compensation of audio signals and the volume control of speakers.

2. Description of Related Art

Figure 1:
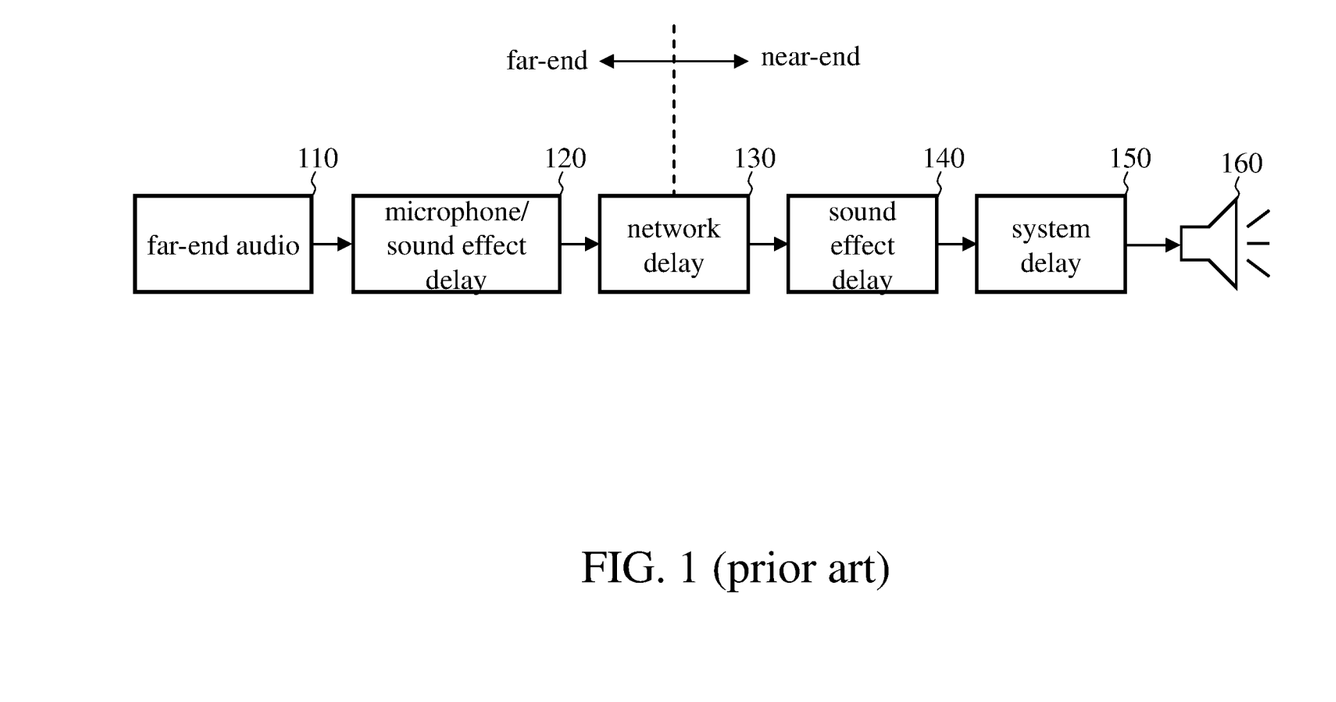
FIG. 1 illustrates a schematic diagram of transmitting audio signals via the network.

FIG. 1 is a schematic diagram of transmitting audio signals via the network. When the far-end device (with a microphone) and the near-end device (with the speaker 160) are connected through the network, the far-end audio 110 may undergo the microphone sound effect delay 120 of the far-end device, the network delay 130, the playback sound effect delay 140 of the near-end device, and the system delay 150 of the near-end device before being played by the speaker 160 of the near-end device. The microphone/sound effect delay 120 is the time from the reception of the sound by the microphone to the generation of the audio signals or even signal processing (such as noise cancellation) by the microphone. The playback sound effect delay 140 is the time latency that the sound effect processing of the near-end device takes to process the audio signal. The system delay 150 is the time latency that the operating system of the near-end device takes to process the audio signal.

When multiple devices are receiving the same audio signal from far-end and playing it in the same space, the sounds that these devices are playing may not be synchronized because the network delay 130, the sound effect delay 140, and the system delay 150 are different from device to device, resulting in a poor user experience. In addition, the end-user could not recognize the content of the sounds clearly due to the noise and howling generated by the heavy loudness from these devices in the environment.

SUMMARY OF THE INVENTION

In view of the issues of the prior art, an object of the present invention is to provide an ultrasound-based audio playback method and an ultrasound-based electronic device, so as to make an improvement to the prior art.

According to one aspect of the present invention, an ultrasound-based audio playback method is provided. The ultrasound-based audio playback method includes the following steps: receiving an ultrasound signal through a microphone; processing the ultrasound signal to obtain a characteristic value of the ultrasound signal; obtaining time lag information between devices based on the characteristic value; and delaying a playback of an audio signal based on the time lag information.

According to another aspect of the present invention, an ultrasound-based audio playback method is provided. The ultrasound-based audio playback method includes the following steps: receiving through a microphone an ultrasound signal played by a device; processing the ultrasound signal to obtain energy and a phase difference of the ultrasound signal; estimating a distance and a direction of the device based on the energy and the phase difference; and adjusting a volume of a speaker or sending a volume adjustment signal based on the distance and the direction.

According to still another aspect of the present invention, an ultrasound-based electronic device is provided. The ultrasound-based electronic device includes a microphone, a memory, and a calculation circuit. The memory stores a plurality of program codes or program instructions. The calculation circuit is coupled to the microphone and the memory and configured to execute the program codes or program instructions to perform following steps: receiving an ultrasound signal through the microphone; processing the ultrasound signal to obtain a characteristic value of the ultrasound signal; obtaining time lag information based on the characteristic value; and delaying a playback of an audio signal according to the time lag information.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes ultrasound-based audio playback methods and an ultrasound-based electronic device. On account of that some or all elements of the ultrasound-based electronic device could be known, the detail of such elements is omitted provided that such detail has little to do with the features of this disclosure, and that this omission nowhere dissatisfies the specification and enablement requirements. Some or all of the processes of the ultrasound-based audio playback method may be implemented by software and/or firmware, and can be performed by ultrasound-based electronic device or its equivalent. A person having ordinary skill in the art can choose components or steps equivalent to those described in this specification to carry out the present invention, which means that the scope of this invention is not limited to the embodiments in the specification.

Figure 2:
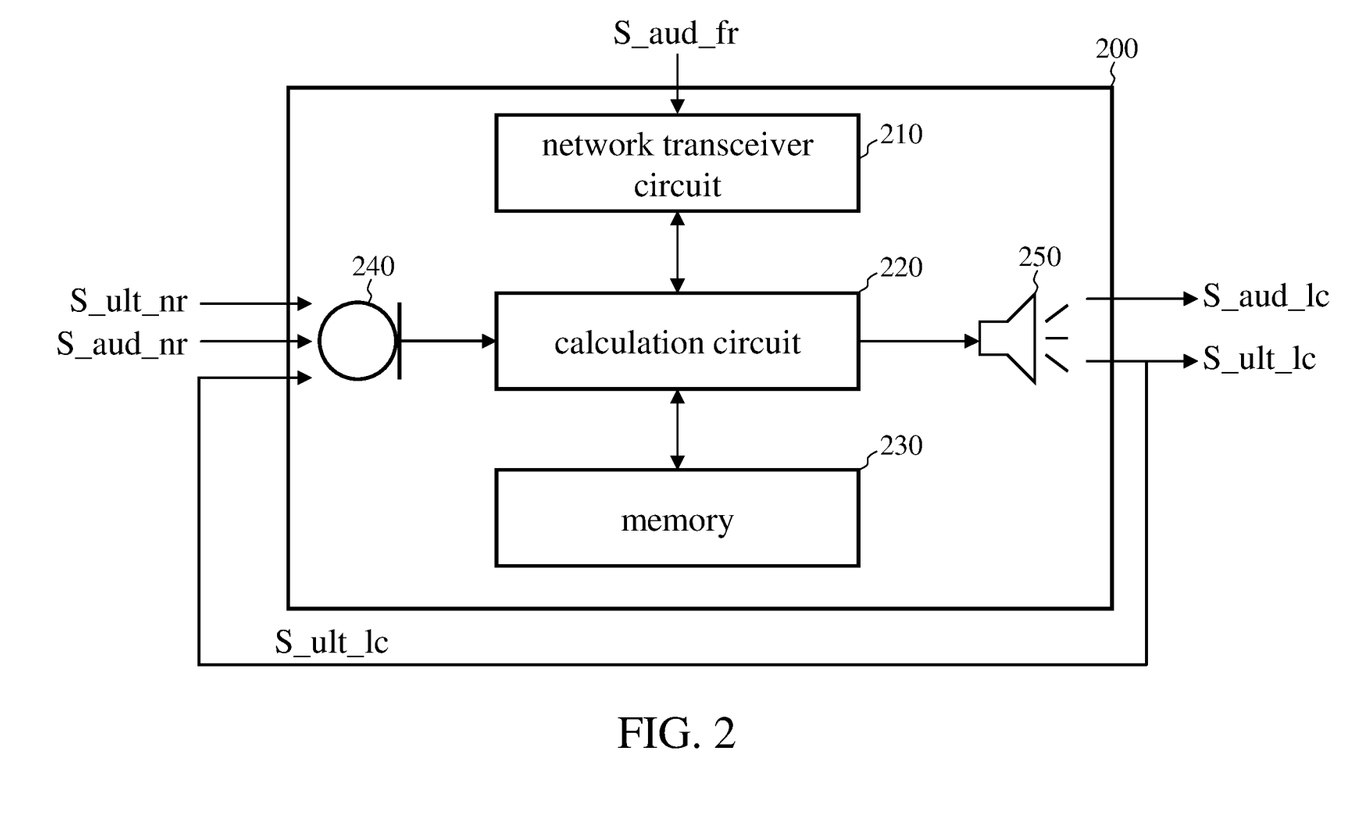
FIG. 2 illustrates a functional block diagram of the electronic device according to an embodiment of the present invention.

FIG. 2 is a functional block diagram of the electronic device according to an embodiment of the present invention. The electronic device 200 includes a network transceiver circuit 210, a calculation circuit 220, a memory 230, a microphone 240, and a speaker 250. The calculation circuit 220 receives the far-end audio signal S_aud_fr from the network (e.g., Internet) through the network transceiver circuit 210, plays the local ultrasound signal S_ult_lc and the local audio signal S_aud_lc through the speaker 250, and receives the near-end ultrasound signal S_ult_nr and the near-end audio signal S_aud_nr through the microphone 240. In this disclosure, "near-end" refers to the space where the electronic device 200 is present (e.g., a conference room or classroom), and the user of the electronic device 200 can directly hear the near-end audio signal S_aud_nr that another device in the same space (i.e., the near-end device) is playing; "far-end" refers to the space where the electronic device 200 is not present (e.g., a conference room or classroom in another place), and the user of the electronic device 200 cannot directly hear the far-end audio signal S_aud_fr in that space, which, for example, may be generated by the user in that space and transmitted to the electronic device 200 via a far-end device and the network; "local" refers to the electronic device 200 itself.

The near-end devices and local devices referred to in this disclosure can be computers (such as desktop computers or laptop computers), portable electronic devices (such as tablets, mobile phones), or other electronic products that have network access capabilities and include a microphone and a speaker.

Figure 3:
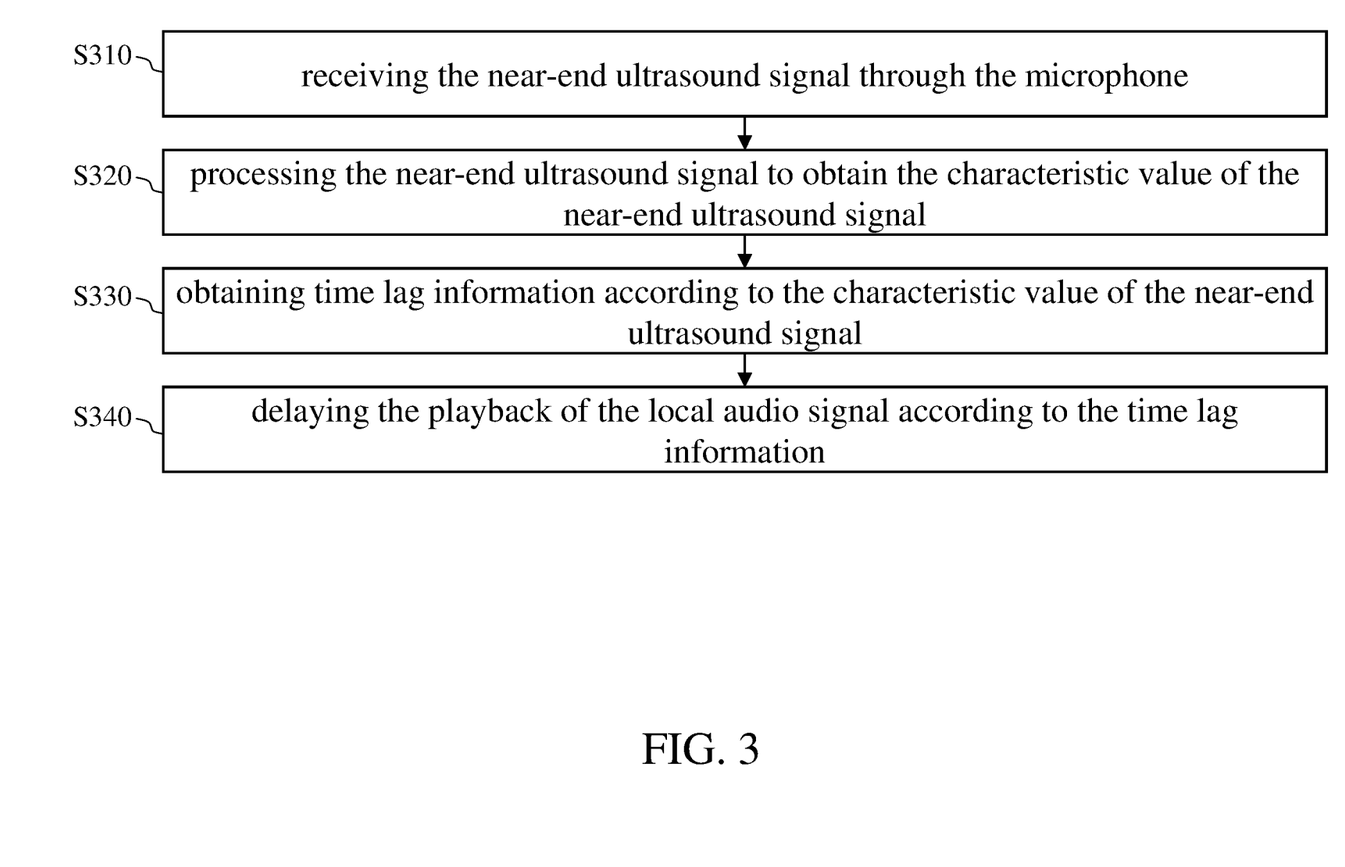
FIG. 3 illustrates a flowchart of an ultrasound-based audio playback method according to an embodiment of the present invention.

Reference is made to FIG. 3 which shows a flowchart of an ultrasound-based audio playback method according to an embodiment of the present invention. The method includes the following steps.

Step S310: the calculation circuit 220 of the electronic device 200 receives, through the microphone 240, the near-end ultrasound signal S_ult_nr that the near-end device (i.e., another device in the same space as the electronic device 200) plays.

Step S320: the calculation circuit 220 processes the near-end ultrasound signal S_ult_nr to obtain the characteristic value of the near-end ultrasound signal S_ult_nr. For example, the characteristic value is the energy or frequency of the near-end ultrasound signal S_ult_nr.

Step S330: the calculation circuit 220 obtaining time lag information according to the characteristic value of the near-end ultrasound signal S_ult_nr. The time lag information can indicate the audio signal delay time between the near-end device and the electronic device 200.

Step S340: the playback of the local audio signal S_aud_lc is delayed according to the time lag information to reduce the delay between the local audio signal S_aud_lc and the near-end audio signal S_aud_nr as much as possible, so that the user of the electronic device 200 has a better experience. For example, if the time lag information shows that the time lag is one second, the calculation circuit 220 delays the received far-end audio signal S_aud_fr by one second before playback.

Figure 4:
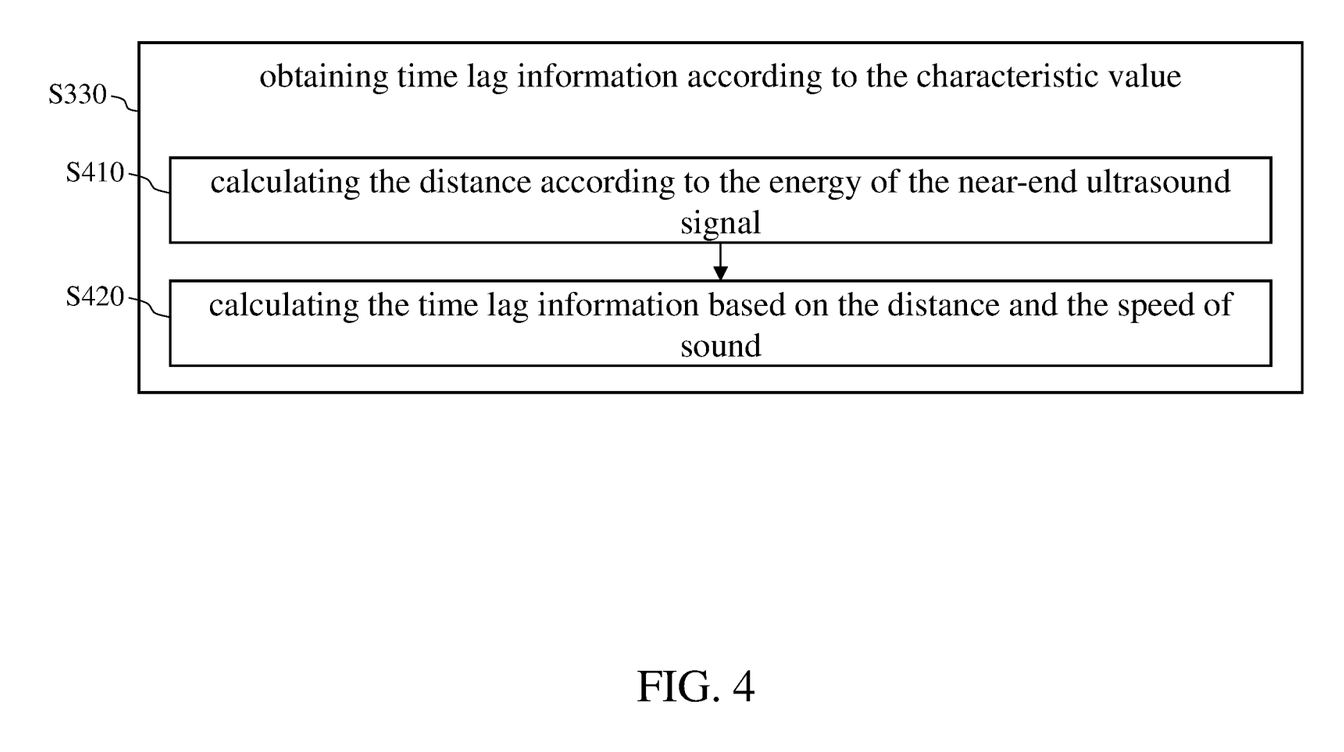
FIG. 4 illustrates a flowchart of step S330.

Reference is made to FIG. 4, which is a flowchart of step S330, including the following sub-steps.

Step S410: the calculation circuit 220 calculates the distance according to the energy of the near-end ultrasound signal S_ult_nr. If the near-end device transmits the near-end ultrasound signal S_ult_nr with a preset energy (which, for example, may be 40 dB and is known to the electronic device 200 in advance), the local device (i.e., the electronic device 200) can know the distance between the near-end device and the local device by comparing the energy of the received near-end ultrasound signal S_ult_nr with the preset energy. In other words, in this embodiment, the characteristic value of step S330 is the energy of the ultrasound signal. In some embodiments, the energy of the ultrasound signal can be represented by the sound pressure level (SPL) of the ultrasound signal. The greater the energy of the ultrasound signal, the higher the SPL. Generally speaking, when other factors are not taken into consideration, the relationship between the SPL and distance is as follows:

$$SPL_2 = SPL_1 + \left| 10 \cdot \log_{10}\left(\frac{d_1}{d_2}\right)^2 \right| \quad (1)$$

where $SPL_1$ represents the sound pressure level measured at the first point which is away from the sound source by distance $d_1$, and $SPL_2$ is the sound pressure level measured at the second point which is away from the sound source by distance $d_2$. Based on equation (1) and the characteristic value (i.e., the SPL or energy) of the near-end ultrasound signal S_ult_nr, the calculation circuit 220 can know the distance between the near-end device and the electronic device 200. People having ordinary skill in the art can obtain information about the SPL of the ultrasound signal in the following websites: en.wikipedia.org/wiki/Sound_pressure and en.wikipedia.org/wiki/Inverse-square_law.

Step S420: the calculation circuit 220 calculates the time lag information based on the distance and the speed of sound. More specifically, the calculation circuit 220 can obtain the time required for the near-end ultrasound signal to travel from the near-end device to the local device by dividing the distance by the speed of sound (e.g., the speed of sound in the air at room temperature). The required time is the time lag information in step S330.

Figure 5:
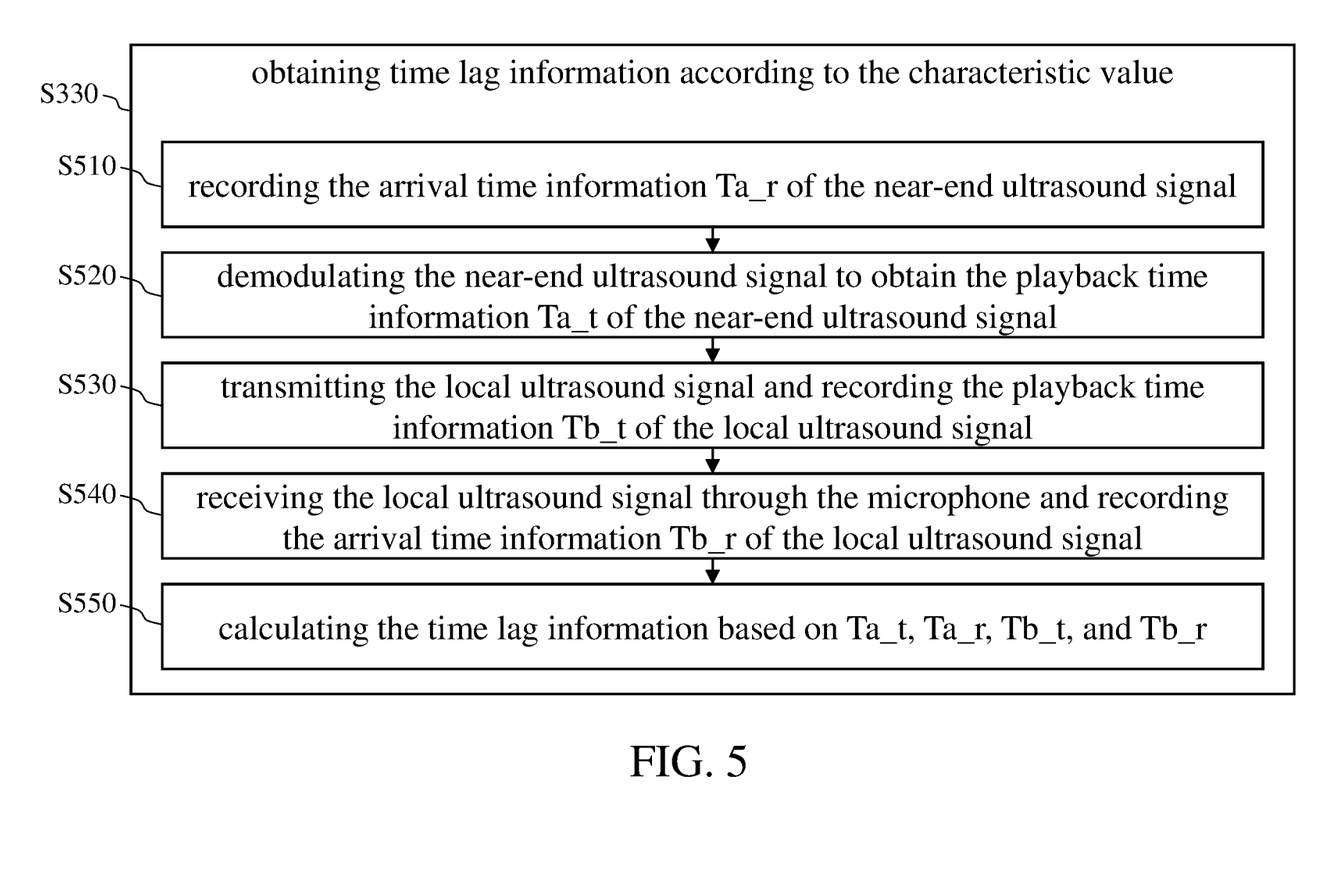
FIG. 5 illustrates another flowchart of step S330.

Reference is made to FIG. 5, which is a flowchart of step S330 according to another embodiment. In this embodiment, the near-end device performs the frequency-shift keying operation on the near-end ultrasound signal S_ult_nr, so as to use different frequencies to represent different numbers. For example, 21 kHz represents the number "0," 22 kHz represents the number "1," and so on. In this way, the near-end ultrasound signal S_ult_nr can carry its system time during playback (i.e., the time at which the near-end device transmits the near-end ultrasound signal S_ult_nr). Step S330 includes the following sub-steps.

Step S510: the calculation circuit 220 records the arrival time information Ta_r of the near-end ultrasound signal S_ult_nr which is the time point at which the electronic device 200 receives the near-end ultrasound signal S_ult_nr.

Step S520: the calculation circuit 220 demodulates the near-end ultrasound signal S_ult_nr to obtain the playback time information Ta_t of the near-end ultrasound signal S_ult_nr (i.e., the time point at which the near-end device plays the near-end ultrasound signal S_ult_nr). In other words, in this embodiment, the characteristic value of step S330 is the frequency of the ultrasound signal. The demodulation operation is well-known to people having ordinary skill in the art, and the details are thus omitted for brevity.

Step S530: the calculation circuit 220 plays the local ultrasound signal S_ult_lc through the speaker 250 and records the playback time information Tb_t of the local ultrasound signal S_ult_lc (i.e., the time point at which the electronic device 200 plays the local ultrasound signal S_ult_lc).

Step S540: the calculation circuit 220 receives the local ultrasound signal S_ult_lc through the microphone 240 and records the arrival time information Tb_r of the local ultrasound signal S_ult_lc which is the time point at which the electronic device 200 receives the local ultrasound signal S_ult_lc.

Step S550: the time lag information is calculated based on the playback time information Ta_t of the near-end ultrasound signal S_ult_nr, the arrival time information Ta_r of the near-end ultrasound signal S_ult_nr, the playback time information Tb_t of the local ultrasound signal S_ult_lc, and the arrival time information Tb_r of the local ultrasound signal S_ult_lc. More specifically, the time lag information is (Ta_r−Ta_t)−(Tb_r−Tb_t).

Compared to the embodiment of FIG. 4, the embodiment of FIG. 5 can obtain more accurate time lag information. More specifically, the time lag between the playback of a sound wave (such as an ultrasound signal or an audio signal audible to the human ear) by a near-end device to the reception of the sound wave by a local device (which simulates the hearing of the audio signal by the user of the local device) includes the sound effect delay of the near-end device, the system delay of the near-end device, the path delay (i.e., the time that the sound waves takes to travel in the air from the near-end device to the local device), and the microphone/sound effect delay of the local device; the time lag between the playback of a sound wave (such as an ultrasound signal or an audio signal audible to the human ear) by the local device to the reception of the sound wave by the local device (which simulates the hearing of the audio signal by the user of the local device) includes the sound effect delay of the local device, the system delay of the local device, and the microphone/sound effect delay of the local device. That is to say, the embodiment of FIG. 5 considers all the aforementioned delays, so the obtained time lag information has higher accuracy.

Figure 6:
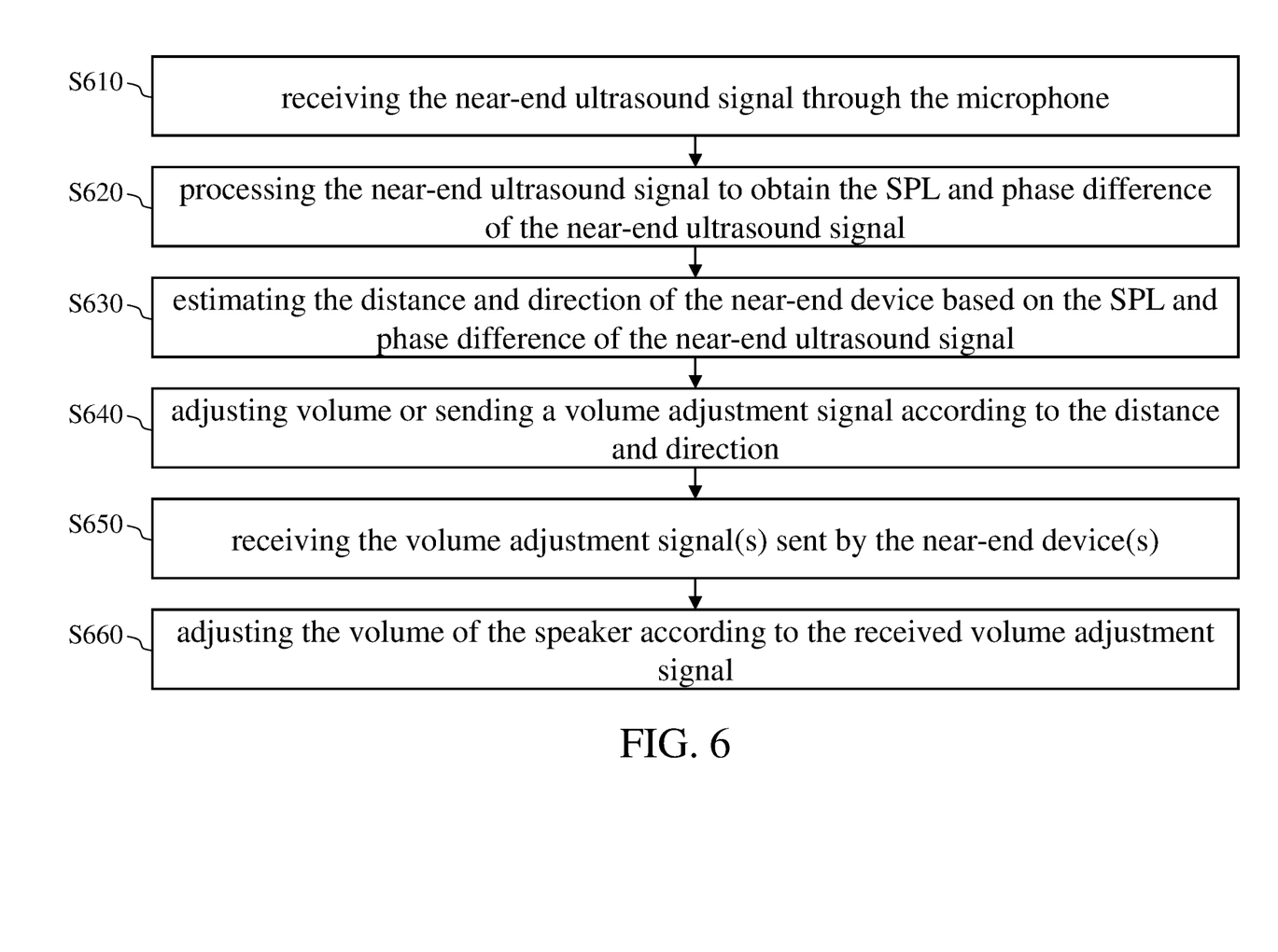
FIG. 6 illustrates a flowchart of an ultrasound-based audio playback method according to another embodiment of the present invention.

Reference is made to FIG. 6, which is a flowchart of an ultrasound-based audio playback method according to another embodiment of the present invention. The method includes the following steps.

Step S610: the calculation circuit 220 receives the near-end ultrasound signal S_ult_nr through the microphone 240.

Step S620: the calculation circuit 220 processes the near-end ultrasound signal S_ult_nr to obtain the SPL and phase difference of the near-end ultrasound signal S_ult_nr (please refer to: en.wikipedia.org/wiki/Phase_(waves)).

Figure 7:
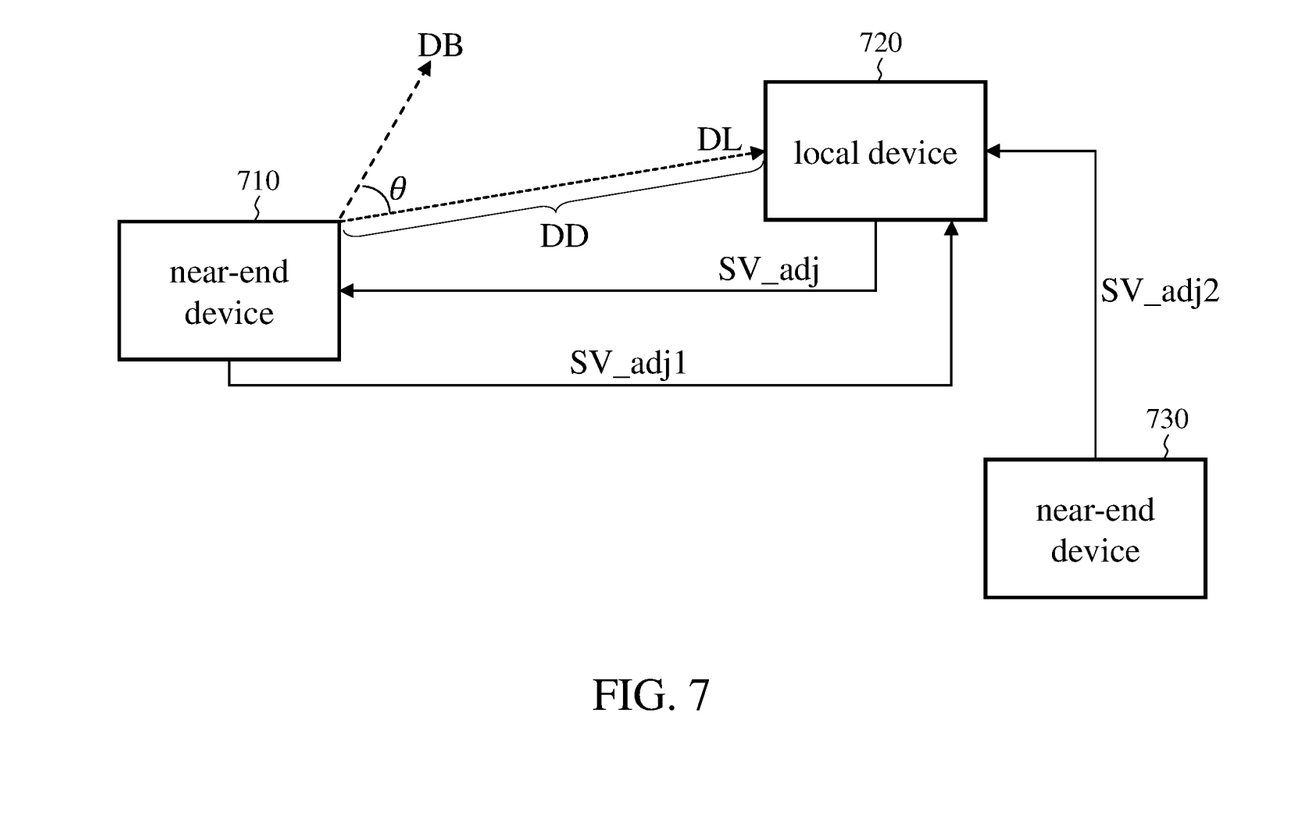
FIG. 7 illustrates the distance and direction between the near-end device and the local device.

Step S630: the calculation circuit 220 estimates the distance and direction of the near-end device (i.e., to estimate the sound source information about the near-end ultrasound signal S_ult_nr) based on the SPL and phase difference of the near-end ultrasound signal S_ult_nr. The calculation circuit 220 may use the SPL to estimate the distance of the near-end device based on equation (1) and use the phase difference to estimate the direction of the near-end device based on the beam-forming technology. Please refer to en.wikipedia.org/wiki/Beamforming and www.labbookpages.co.uk/audio/beamforming/delaySum.html for more information about the beam-forming technology; the details are omitted herein for brevity. In some embodiments, as shown in FIG. 7, the direction of the near-end device can be represented by an angle θ (0°≤θ≤180°) between the sound playback direction DB of the near-end device 710 (i.e., the direction of the speaker (not shown) of the near-end device 710) and the connection direction DL. The connection direction DL is the linear direction from the near-end device 710 to the local device 720, particularly, the linear direction between the speaker of the near-end device 710 and the local device 720. The distance between the near-end device 710 and the local device 720 is represented by the distance DD.

Step S640: the calculation circuit 220 adjusts its own volume or sends a volume adjustment signal to the near-end device according to the distance and direction. For example, when the distance DD and/or the angle θ become(s) smaller (larger), the local device 720 turns down (up) the volume of its own speaker, and/or uses the volume adjustment signal SV_adj to instruct the near-end device 710 to turn down (up) the volume. In this way, howling can be suppressed or prevented. The volume adjustment signal SV_adj can be an ultrasound signal (e.g., the control information (e.g., the target volume) can be carried by frequency-shift keying) or a network signal (e.g., the control information is transmitted through a wired/wireless network). In some embodiments, the control information can be determined based on experience. For example, the memory 230 of the electronic device 200 stores a look-up table, and the calculation circuit 220 uses the distance DD and/or the angle as the index(es) to retrieve the control information from the look-up table.

When multiple devices (e.g., three or more devices, such as the near-end device 710, the local device 720, and the near-end device 730) in the same space (e.g., a conference room or classroom), each implements the embodiment of FIG. 6, the speakers of the devices can be considered as a speaker array, and after each device (e.g., the local device 720) receives the volume adjustment signals (e.g., SV_adj1 and SV_adj2) from other devices (e.g., the near-end device 710 and the near-end device 730) (i.e., step S650: the local device 720 receives the volume adjustment signals sent by the near-end devices 710 and 730), each device can adjust the volume of their own speaker by means of sound field adjustment according to the received volume adjustment signals (i.e., step S660: the calculation circuit 220 of the local device 720 adjusts the volume of the speaker according to the received volume adjustment signal, such as by looking up the look-up table), so that the spatial sound field synthesis is comfortable for the user.

For example, in some embodiments, based on the configuration of the near-end space (e.g., the volume of the space, the shape of the space, the indoor items, the material of the items, etc.) and the distances between the speakers of the devices (e.g., multiple electronic devices 200), the devices (e.g., the calculation circuit 220 of the electronic device 200) can determine the acoustically bright zones (which refer to the spots of relatively high sound energy in the space when multiple speakers play sounds at a specific volume and/or directivity) and acoustically dark zones (which, in relative, refer to the spots of relative low sound energy in the space when multiple speakers play sounds at a specific volume) that can be formed in the near-end space by means of the speakers (e.g., multiple speakers 250) of the devices. Based on the acoustically bright zones, the acoustically dark zones, and the user's location in the near-end space (e.g., under normal circumstances, the users in the conference room are roughly within a certain angle and distance from the front of their laptop computer), the device(s) can control its(their) corresponding speaker(s) to play sounds at a specific volume and/or directivity, so that the user(s) of one or more near-end devices can be covered in the acoustically bright zones (including the synthesized acoustically bright zones of the speakers of multiple near-end devices and the acoustically bright zone generated by the speaker(s) of a single near-end device) instead of the acoustically dark zones.

In some embodiments, the calculation circuit 220 can perform the steps of FIG. 3 and FIG. 6 together to delay and control the volume of the speaker 250 according to the time lag information and the volume adjustment signal(s) of itself and/or other near-end devices, so that the audio signals that the speaker 250 plays have the effects of delay correction and spatial sound field synthesis. This, however, is merely an illustrative embodiment, and the present disclosure is not limited thereto.

In some embodiments, the calculation circuit 220 may be a circuit or an electronic component having the program execution capability; for example, the calculation circuit 220 can be a central processing unit, a microprocessor, a microcontroller, a micro processing unit, a digital signal processor (DSP), or the equivalent circuit thereof. The calculation circuit 220 performs the steps of FIGS. 3 to 6 by executing the program codes or program instructions stored in the memory 230. In other embodiments, people having ordinary skill in the art can design the calculation circuit 220 based on the above discussions. That is to say, the calculation circuit 220 can be an application specific integrated circuit (ASIC) or embodied by circuits or hardware such as programmable logic device (PLD).

According to the present invention, the ultrasound-based audio playback method can adjust the sound delay to synchronize the sounds in the same space as much as possible, and/or adjust the volumes of the sounds to make the spatial sound field synthesis in the space more comfortable to the users. In comparison with the prior art, the present invention can prevent howling in the space, and therefore improve the user experience.

Since a person having ordinary skill in the art can appreciate the implementation detail and the modification thereto of the present method invention through the disclosure of the device invention, repeated and redundant description is thus omitted. The shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An ultrasound-based audio playback method, comprising:
   receiving an ultrasound signal through a microphone;
   processing the ultrasound signal to obtain a characteristic value of the ultrasound signal;
   obtaining time lag information based on the characteristic value; and
   delaying a playback of an audio signal according to the time lag information.

2. The method of claim 1, wherein the step of obtaining the time lag information based on the characteristic value comprises:
   calculating a distance based on energy of the ultrasound signal; and
   dividing the distance by the speed of sound to obtain the time lag information.

3. The method of claim 1, wherein the ultrasound signal is a near-end ultrasound signal, and the step of obtaining the time lag information based on the characteristic value comprises:
   recording first arrival time information of the near-end ultrasound signal;
   demodulating the near-end ultrasound signal to obtain first playback time information of the near-end ultrasound signal;
   transmitting a local ultrasound signal and recording second playback time information of the local ultrasound signal;
   receiving the local ultrasound signal through the microphone and recording second arrival time information of the local ultrasound signal; and
   calculating the time lag information based on the first playback time information, the first arrival time information, the second playback time information, and the second arrival time information.

4. An ultrasound-based audio playback method, comprising:
   receiving through a microphone an ultrasound signal played by a device;
   processing the ultrasound signal to obtain energy and a phase difference of the ultrasound signal;
   estimating a distance and a direction of the device based on the energy and the phase difference; and
   adjusting a volume of a speaker or sending a volume adjustment signal based on the distance and the direction.

5. The method of claim 4, wherein the ultrasound signal is a first ultrasound signal, and the volume adjustment signal is a second ultrasound signal that has been modulated.

6. The method of claim 4, wherein the step of adjusting the volume of the speaker or sending the volume adjustment signal based on the distance and the direction is to use a look-up table to generate the volume adjustment signal according to the distance and the direction.

7. The method of claim 4, wherein the device is a first device, and the method further comprises:
   receiving a first volume adjustment signal sent by the first device;
   receiving a second volume adjustment signal sent by a second device; and
   adjusting the volume of the speaker according to the first volume adjustment signal and the second volume adjustment signal.

8. An ultrasound-based electronic device, comprising:
   a microphone;
   a memory storing a plurality of program codes or program instructions; and
   a calculation circuit, coupled to the microphone and the memory and configured to execute the program codes or program instructions to perform following steps:
      receiving an ultrasound signal through the microphone;
      processing the ultrasound signal to obtain a characteristic value of the ultrasound signal;
      obtaining time lag information based on the characteristic value; and
      delaying a playback of an audio signal according to the time lag information.

9. The ultrasound-based electronic device of claim 8, wherein the calculation circuit further performs following steps to perform the step of obtaining the time lag information based on the characteristic value:
   calculating a distance based on energy of the ultrasound signal; and dividing the distance by the speed of sound to obtain the time lag information.

10. The ultrasound-based electronic device of claim 8, wherein the ultrasound signal is a near-end ultrasound signal, and the calculation circuit further performs following steps to perform the step of obtaining the time lag information based on the characteristic value:
- recording first arrival time information of the near-end ultrasound signal;
- demodulating the near-end ultrasound signal to obtain first playback time information of the near-end ultrasound signal;
- transmitting a local ultrasound signal and recording second playback time information of the local ultrasound signal;
- receiving the local ultrasound signal through the microphone and recording second arrival time information of the local ultrasound signal; and
- calculating the time lag information based on the first playback time information, the first arrival time information, the second playback time information, and the second arrival time information.

\* \* \* \* \*